United States Patent
Zhang et al.

(10) Patent No.: US 11,722,001 B2
(45) Date of Patent: Aug. 8, 2023

(54) PRE-CHARGING CIRCUIT, INVERTER, AND POWER GENERATION SYSTEM

(71) Applicant: Huawei Digital Power Technologies Co., Ltd., Shenzhen (CN)

(72) Inventors: Yanzhong Zhang, Shanghai (CN); Haijun Ye, Shenzhen (CN); Xiaofeng Yao, Xi'an (CN)

(73) Assignee: Huawei Digital Power Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/749,373

(22) Filed: May 20, 2022

(65) Prior Publication Data

US 2022/0285973 A1 Sep. 8, 2022

Related U.S. Application Data

(63) Continuation of application No. PCT/CN2020/096377, filed on Jun. 16, 2020.

(30) Foreign Application Priority Data

Nov. 22, 2019 (CN) .......................... 201911158858.X

(51) Int. Cl.
  *H02J 7/35* (2006.01)
  *H02J 3/38* (2006.01)
  *H02M 1/32* (2007.01)
  *H02M 7/44* (2006.01)

(52) U.S. Cl.
  CPC ............... *H02J 7/35* (2013.01); *H02J 3/381* (2013.01); *H02M 1/32* (2013.01); *H02M 7/44* (2013.01); *H02J 2207/20* (2020.01); *H02J 2207/50* (2020.01); *H02J 2300/24* (2020.01)

(58) Field of Classification Search
  CPC ...... H02J 7/35; H02J 3/38; H02J 3/381; H02J 2207/20; H02J 2300/24; H02J 2207/50; H02M 1/32; H02M 7/44
  See application file for complete search history.

(56) References Cited

U.S. PATENT DOCUMENTS

| | | |
|---|---|---|
| 2010/0226160 A1 | 9/2010 | Prior et al. |
| 2015/0280607 A1 | 10/2015 | Wachenfeld et al. |
| 2015/0288224 A1 | 10/2015 | Allert |

FOREIGN PATENT DOCUMENTS

| | | |
|---|---|---|
| CN | 201910625 U | 7/2011 |
| CN | 102449876 A | 5/2012 |
| CN | 102484372 A | 5/2012 |
| CN | 202261042 U | 5/2012 |
| CN | 103814514 A | 5/2014 |
| CN | 104037785 A | 9/2014 |
| CN | 104300777 A | 1/2015 |

(Continued)

*Primary Examiner* — Robert L Deberadinis
(74) *Attorney, Agent, or Firm* — Maier & Maier, PLLC

(57) ABSTRACT

A pre-charging circuit is provided, including a first switch, a second switch, a diode, a first current-limiting apparatus, a capacitor, and an inverter unit. One end of the pre-charging circuit is connected to a power grid. After the first current-limiting apparatus, the first switch, and the diode are connected in series, one end of a line formed by the series connection is connected to one terminal of the capacitor, the other end of the line is connected to a first-phase alternating current of the power grid, and the other terminal of the capacitor is connected to a second-phase alternating current of the power grid via the inverter unit and the second switch successively.

17 Claims, 12 Drawing Sheets

(56) References Cited

FOREIGN PATENT DOCUMENTS

| | | |
|---|---|---|
| CN | 104410308 A | 3/2015 |
| CN | 104467016 A | 3/2015 |
| CN | 104967300 A | 10/2015 |
| CN | 105490286 A | 4/2016 |
| CN | 207124475 U | 3/2018 |
| CN | 108540006 A | 9/2018 |
| CN | 109565245 A | 4/2019 |
| CN | 110994968 A | 4/2020 |
| EP | 0477367 A1 | 4/1992 |
| JP | H04161097 A | 6/1992 |
| WO | 2008066000 A1 | 6/2008 |
| WO | 2016206688 A1 | 12/2016 |

US 11,722,001 B2

PRE-CHARGING CIRCUIT, INVERTER, AND POWER GENERATION SYSTEM

CROSS-REFERENCE TO RELATED APPLICATIONS

This application is a continuation of International Application No. PCT/CN2020/096377, filed on Jun. 16, 2020, which claims priority to Chinese Patent Application No. 201911158858.X, filed on Nov. 22, 2019. The disclosures of the aforementioned applications are hereby incorporated by reference in their entireties.

TECHNICAL FIELD

The embodiments relate to the field of photovoltaic power generation technologies and a pre-charging circuit.

BACKGROUND

A photovoltaic inverter is an energy conversion apparatus in a photovoltaic power generation system and is configured to convert a direct current output by a photovoltaic cell into an alternating current and then transfer the alternating current to a power grid. The photovoltaic inverter is in an idle state at night, but there is a need to perform reactive compensation on the power grid at night. To make full use of the photovoltaic inverter, the photovoltaic inverter may be used at night to supplement reactive power for the power grid in real time, to implement a night static var generator (SVG) function.

When the photovoltaic inverter is operated in an SVG mode, a bus capacitor needs to be pre-charged to avoid current shock resulting from a large voltage difference between a direct current bus voltage and a peak voltage of the power grid at a moment of grid connection. However, a current pre-charging circuit has a complex structure and high costs. Therefore, it is urgent to provide a pre-charging circuit with a simple structure and low costs.

SUMMARY

The embodiments may provide a pre-charging circuit. The pre-charging circuit has a simple structure, and has a small change based on an existing inverter.

To achieve the foregoing objective, the embodiments provide the following solutions.

A first aspect provides a pre-charging circuit. The pre-charging circuit may include a first switch, a second switch, a diode, a first current-limiting apparatus, a capacitor, and an inverter unit, where one end of the pre-charging circuit is connected to a power grid. After the first current-limiting apparatus, the first switch, and the diode are connected in series, one end of a line formed by the series connection is connected to one terminal of the capacitor, the other end of the line is connected to a first-phase alternating current of the power grid, and the other terminal of the capacitor is connected to a second-phase alternating current of the power grid via the inverter unit and the second switch successively. After the first switch and the second switch are closed, a current output by the power grid passes through a closed loop formed by the first current-limiting apparatus, the first switch, the diode, the capacitor, the inverter unit, and the second switch, to charge the capacitor. It can be understood from the first aspect that, compared with a conventional technology, in the pre-charging circuit provided in the first aspect, the closed loop includes fewer components, and only a small quantity of components need to be used to pre-charge the bus capacitor when no direct current is input, so as to supply power to an entire inverter system for reactive compensation. The pre-charging circuit has a simple structure and lower costs.

Optionally, with reference to the first aspect, in a first possible implementation, the pre-charging circuit may further include a third switch, where after the first current-limiting apparatus, the first switch, and the diode are connected in series, the other end of the line is connected to the first-phase alternating current of the power grid by using the third switch. After the first switch, the second switch, and the third switch are closed, the current output by the power grid passes through a closed loop formed by the third switch, the first current-limiting apparatus, the first switch, the diode, the capacitor, the inverter unit, and the second switch, to charge the capacitor. The pre-charging circuit provided in the first possible implementation of the first aspect may be used in a classical inverter system. In the first possible implementation of the first aspect, another pre-charging circuit is provided, thereby improving diversity of solutions.

Optionally, with reference to the first possible implementation of the first aspect, in a second possible implementation, the method may further include a fourth switch, where the fourth switch is connected in series to the second switch, and the other terminal of the capacitor is connected to the second-phase alternating current of the power grid via the inverter unit, the second switch, and the fourth switch successively. After the first switch, the third switch, the second switch, and the fourth switch are closed, the current output by the power grid passes through a closed loop formed by the third switch, the first current-limiting apparatus, the first switch, the diode, the capacitor, the inverter unit, the second switch, and the fourth switch, to charge the capacitor. The pre-charging circuit provided in the second possible implementation of the first aspect may be used in a classical inverter system. In the second possible implementation of the first aspect, another pre-charging circuit is provided, thereby improving diversity of solutions.

Optionally, with reference to the second possible implementation of the first aspect, in a third possible implementation, the method may further include a fifth switch and a second current-limiting apparatus, where the fifth switch and the second current-limiting apparatus are connected in series and then connected in parallel to the second switch, and after the fifth switch and the second current-limiting apparatus are connected in series, one end of a line formed by the series connection is connected to the inverter unit, and the other end of the line is connected to the second-phase alternating current of the power grid. After the first switch, the third switch, the fifth switch, and the fourth switch are closed, the current output by the power grid passes through a closed loop formed by the third switch, the first current-limiting apparatus, the first switch, the diode, the capacitor, the inverter unit, the fifth switch, and the fourth switch, to charge the capacitor. In the third possible implementation of the first aspect, another pre-charging circuit is provided, thereby improving diversity of solutions. In the third possible implementation of the first aspect, one group of switches in the inverter system may be uniformly controlled.

Optionally, with reference to the second possible implementation of the first aspect, in a fourth possible implementation, the pre-charging circuit further includes a fifth switch and a second current-limiting apparatus, where the fifth switch and the second current-limiting apparatus are connected in series and then connected in parallel to the fourth switch, and after the fifth switch and the second current-limiting apparatus are connected in series, one end of a line formed by the series connection is connected to the inverter unit, and the other end of the line is connected to the second-phase alternating current of the power grid. After the first switch, the third switch, the fifth switch, and the second switch are closed, the current output by the power grid passes through a closed loop formed by the third switch, the first current-limiting apparatus, the first switch, the diode, the capacitor, the inverter unit, the second switch, and the fifth switch, to charge the capacitor. In the fourth possible implementation of the first aspect, another pre-charging circuit is provided, thereby improving diversity of solutions. In the fourth possible implementation of the first aspect, one group of switches in the inverter system may be uniformly controlled.

Optionally, with reference to the first to the fourth possible implementations of the first aspect, in a fifth possible implementation, the current-limiting apparatus is one or a combination of a resistor and an inductor.

Optionally, with reference to the first to the fourth possible implementations of the first aspect, in a sixth possible implementation, the first switch, the second switch, the third switch, the fourth switch, and the fifth switch each are a relay, a metal-oxide semiconductor field-effect transistor (MOSFET), or an insulated gate bipolar transistor (IGBT).

A second aspect provides an inverter, including a control unit and an inverter power unit. The control unit is configured to control work of the inverter power unit, and the inverter power unit includes the pre-charging circuit according to any one of the first aspect or the possible implementations of the first aspect.

A third aspect provides a power generation system. The power generation system may include a photovoltaic PV cell, an inverter, and a power grid. The PV cell is connected to the inverter, and the inverter is connected to the power grid. The PV cell is configured to convert light energy into a direct current. The inverter includes the pre-charging circuit described in any one of the first aspect or the possible implementations of the first aspect and is configured to convert a direct current into an alternating current. The inverter is further configured to perform reactive compensation on the power grid. The power grid is configured to transfer the alternating current.

Optionally, with reference to the third aspect, in a first possible implementation, the inverter further includes an isolation unit, where the isolation unit includes a sixth switch. One terminal of the sixth switch is connected to a positive electrode of the PV cell, and the other terminal of the sixth switch is connected to a positive electrode of a circuit connected to the power grid. Alternatively, one terminal of the sixth switch is connected to a negative electrode of the PV cell, and the other terminal of the sixth switch is connected to a negative electrode of a circuit connected to the power grid. It can be understood from the first possible implementation of the third aspect that, the inverter includes the isolation unit, and the PV cell is isolated from the power grid by using the switch. This avoids impact of the power grid on the PV cell.

Optionally, with reference to the third aspect, in a second possible implementation, the inverter further includes an isolation unit, where the isolation unit includes a unidirectional conduction component. One terminal of the unidirectional conduction component is connected to a positive electrode of the PV cell, and the other terminal of the unidirectional conduction component is connected to a positive electrode of a circuit connected to the power grid. Alternatively, one terminal of the unidirectional conduction component is connected to a negative electrode of the PV cell, and the other terminal of the unidirectional conduction component is connected to a negative electrode of a circuit connected to the power grid. It can be understood from the second possible implementation of the third aspect that, the inverter includes the isolation unit, and the PV cell is isolated from the power grid by using the unidirectional conduction component. This avoids impact of the power grid on the PV cell.

The pre-charging circuit is different from that in conventional technologies. The circuit has a simple structure, has a small change based on an existing inverter, and can avoid current shock caused due to a large voltage difference between a direct current bus voltage and a peak voltage of the power grid at a moment of grid connection.

DETAILED DESCRIPTION OF THE EMBODIMENTS

Figure 1A:
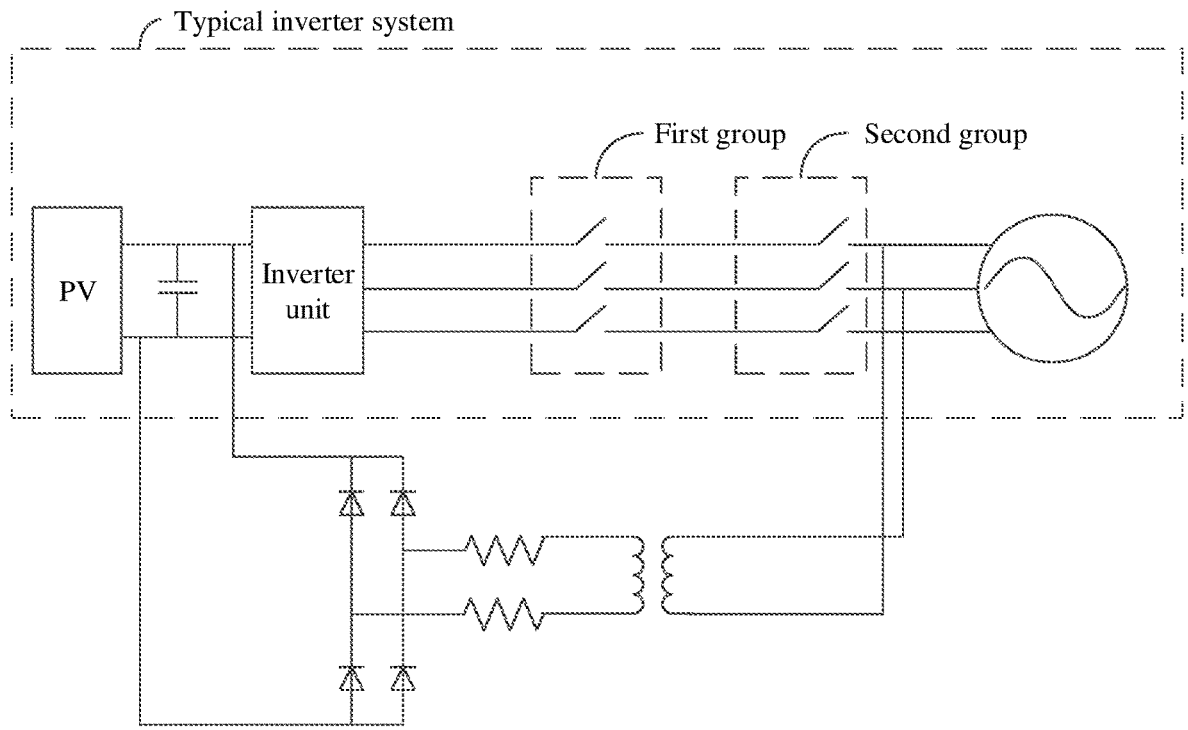
FIG. 1a and FIG. 1b each are a schematic diagram of a structure of a photovoltaic inverter with a reactive compensation function.

The embodiments provide a pre-charging circuit to avoid current shock resulting from a large voltage difference between a direct current bus voltage and a peak voltage of a power grid at a moment of grid connection. The embodiments further provides a corresponding inverter and power generation system. Details are separately described in the following.

The following describes the solutions in the embodiments with reference to the accompanying drawings in the embodiments. The described embodiments are merely some but not all of embodiments. All other embodiments obtained by a person skilled in the art based on the embodiments without creative efforts shall fall within the scope of the embodiments.

A conventional power system consumes a large number of non-renewable resources such as coal and natural gas to supply power, thereby causing pollution to the environment. Solar energy has attracted people's attention by virtue of cleanness, renewability, and other advantages. Output power of a photovoltaic cell or a photovoltaic station is related to environmental factors such as a solar radiation intensity, a temperature, and a wind speed, which change randomly due to impact of natural conditions. Therefore, the output power of the photovoltaic station is unstable. For a grid-connected photovoltaic system, when such unstable power is injected into a power grid, voltage fluctuation is caused in the power grid, in other words, output fluctuation of active power is caused at a grid connection point. Furthermore, in addition to the unstable output power of the photovoltaic station mentioned above that leads to voltage fluctuation in the power grid, there are other factors that may lead to output fluctuation of the active power at the grid connection point. For example, most of power loads in the power grid, such as a motor and a transformer, are inductive loads, output power of these inductive loads is reactive power, an electric energy loss is caused due to transmission of the reactive power from a line and the transformer, and such electric energy loss also leads to output fluctuation of the active power at the grid connection point.

Currently, a voltage at a grid connection point can be stabilized through reactive compensation. Because a photovoltaic station can output active power in daytime, power can be obtained from the photovoltaic station for reactive compensation. In this case, reactive power to be consumed by an inductive load can be provided, so as to reduce reactive power that is provided by a power supply of a power grid to the inductive load and that is transmitted from a line. Because flow of the reactive power in the power grid is reduced, an electric energy loss caused due to transmission of the reactive power from the line and a transformer can be reduced, and output fluctuation of active power at the grid connection point can be improved. However, the photovoltaic station cannot output power at night. Therefore, an additional reactive compensation apparatus is required to perform reactive compensation.

Reactive compensation is also referred to as reactive power compensation sometimes. Reactive compensation can stabilize a voltage at a grid connection point, improve output fluctuation of active power, enhance an electric power transmission capability of a photovoltaic station, and alleviate a problem that a power factor of the photovoltaic station is low at night. The power factor is a coefficient for measuring efficiency of electrical equipment. A low power factor indicates that reactive power of a circuit for alternating magnetic field conversion is high and increases a power supply loss of a line.

Currently, a reactive compensation function is usually implemented in two manners. In one manner, an independent device, for example, a static var generator (SVG), is used to perform reactive compensation. In this manner, the SVG can be independently controlled, and can work both in daytime and at night. In the other manner, a photovoltaic inverter implements a reactive compensation function by using its own characteristic.

Figure 1B:
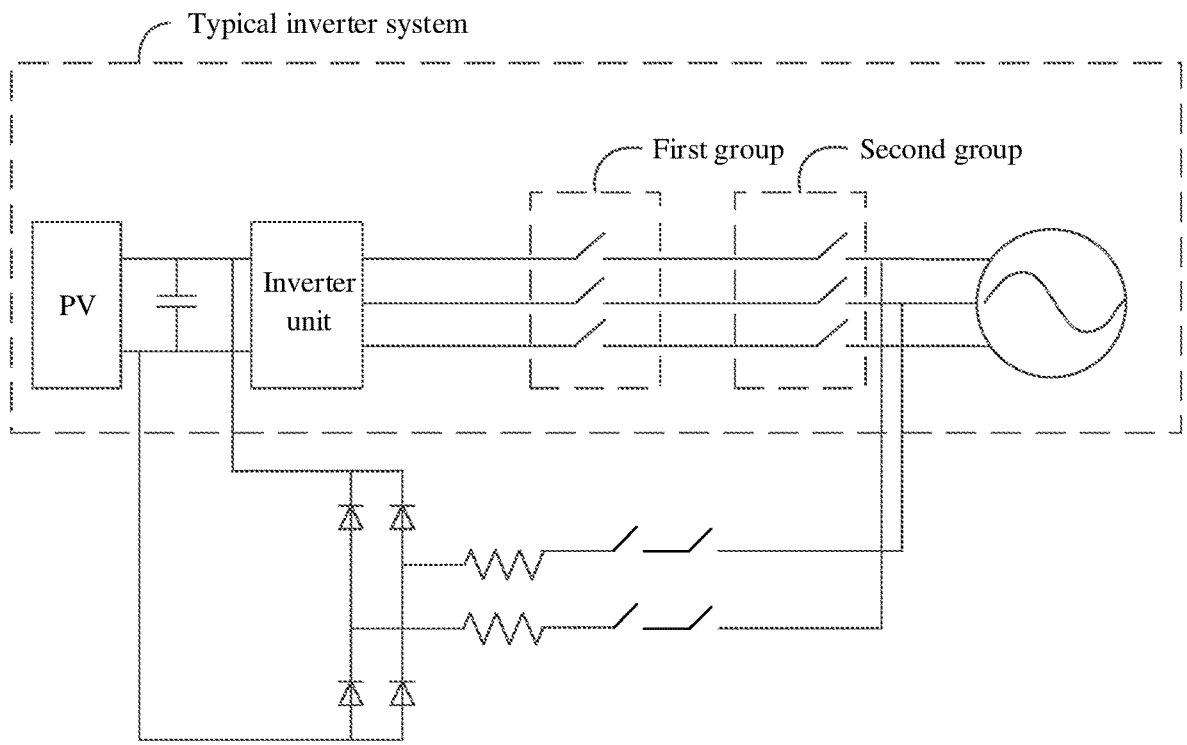

The foregoing two manners have their own disadvantages. In the manner in which the SVG device is used to perform reactive compensation, because the photovoltaic station usually needs to be disposed outdoors and needs to adapt to harsh environments such as environments in which waterproofing and dust prevention are required, the SVG device also needs to adapt to the harsh environments. For example, the SVG device also needs to implement waterproofing, dust prevention, and the like. This increases costs of the SVG. In the manner in which the photovoltaic inverter is changed to a reactive compensation apparatus, a reactive compensation requirement can be satisfied at low costs. However, this manner also has a disadvantage. The following provides a description with reference to FIG. 1a and FIG. 1b. FIG. 1a and FIG. 1b are a schematic diagram of a structure of a photovoltaic inverter with a reactive compensation function. FIG. 1a and FIG. 1b further show a photovoltaic (PV) cell and a power grid. The photovoltaic cell and the inverter with a reactive compensation function jointly form a photovoltaic station. In this scenario, the photovoltaic cell may provide corresponding reactive power in daytime for reactive compensation, but the photovoltaic cell cannot provide the corresponding reactive power at night. Therefore, the inverter with a reactive compensation function performs reactive compensation at night. With reference to FIG. 1a and FIG. 1b, the following describes a principle for performing reactive compensation by the inverter with a reactive compensation function.

As shown in FIG. 1a, the inverter includes: a capacitor, where the capacitor is a bus capacitor and is configured to charge a direct current auxiliary source in an inverter unit; the direct current auxiliary source, configured to supply power to the inverter unit; and the inverter unit, configured to perform reactive compensation at night after being started. The inverter further includes a transformer configured to isolate the power grid from the bus capacitor. The inverter further includes a rectifier bridge including a diode and a resistor, and the rectifier bridge is configured to charge the bus capacitor. Charging herein means pre-charging. Pre-charging is performed to avoid current shock resulting from a large voltage difference between a bus voltage and a peak voltage of the power grid at a moment of grid connection. The inverter further includes a relay configured to control conduction and disconnection of a circuit and a control unit configured to send control instructions to the inverter unit, the transformer, and the relay. The transformer and the rectifier bridge can be considered as a whole, and this part of the circuit is referred to as an isolated alternating current to direct current (AC/DC) converter (below. A system jointly formed by the PV cell, the isolation unit, the inverter unit, and the relay shown in the figure is a typical inverter system. An active power output of the PV cell is almost zero at night, and the PV cell cannot perform reactive compensation. Therefore, the inverter performs reactive compensation at night to output reactive power. The isolated AC/DC converter works after obtaining an alternating current from the power grid, to supply power to the bus capacitor. After the bus capacitor is charged, the control unit controls the isolated AC/DC converter to be turned off. After the bus capacitor is charged, the bus capacitor supplies power to the inverter unit. The bus capacitor may supply power to the direct current auxiliary source (the direct current auxiliary source is not shown in the figure) in the inverter unit. After the inverter unit is started, the control unit controls the relay to be closed and controls the transformer to be disconnected. Because pre-charging is completed, the bus capacitor can directly obtain an alternating current from the power grid by using the relay and the inverter unit, without obtaining an alternating current from the power grid by using the isolated AC/DC converter. Then, the bus capacitor may continuously supply power to the inverter unit, so that the inverter unit can perform reactive compensation.

In the solution shown in FIG. 1a, the bus capacitor is pre-charged by using the transformer and the rectifier bridge. However, a large quantity of components may be used in this manner. Therefore, a structure is complex, and costs are high. It should be noted that, in the solution shown in FIG. 1a, the transformer may be replaced with two switches or four switches. As shown in FIG. 1b, in such a solution, there is also a problem that a structure is complex and costs are high. A pre-charging circuit configured to charge a bus capacitor has a simple structure, uses a small quantity of components, and lower costs. The following provides detailed descriptions.

In the structures shown in FIG. 1a and FIG. 1b, some components are added to the typical inverter system to pre-charge the bus capacitor. In such a typical inverter system, two groups of relays are included between the inverter unit and the power grid, and each group of relays includes three relays. The solution may be applied to such a typical inverter system or may be applied to another inverter system. No limitation is set to an inverter system to which this circuit may be applied. For example, an inverter system may include only one group of relays, and the group of relays may include at least one relay and at most four relays. In addition, in the structures shown in FIG. 1a and FIG. 1b, the power grid may be a three-phase three-wire power grid or a three-phase four-wire power grid. The circuit may be used in a three-phase three-wire power grid or a three-phase four-wire power grid or may be used in another type of power grid, for example, a single-phase power grid. In addition, a manner of controlling one group of relays may be divided into separate control and uniform control. Separate control means that the control unit may separately control turn-on/off of all relays, while uniform control means that the control unit cannot separately control turn-on/off all the relays but can only control the group of relays to be turned on or turned off at the same time. With reference to different inverter systems, the following describes a structure of the circuit.

Figure 2A:
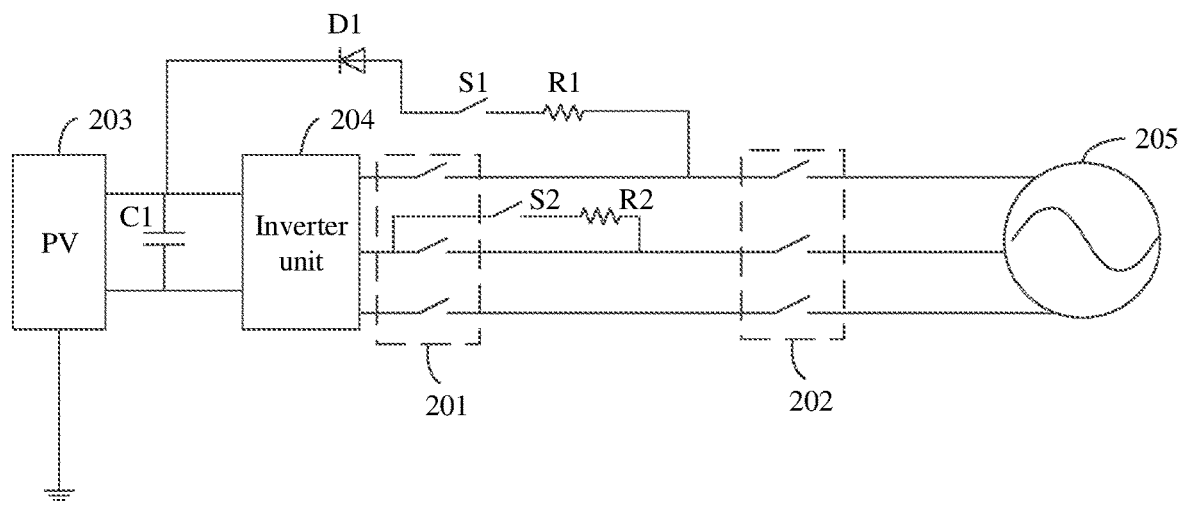
FIG. 2a and FIG. 2b each are a schematic diagram of a structure of a circuit according to an embodiment.
Figure 2B:
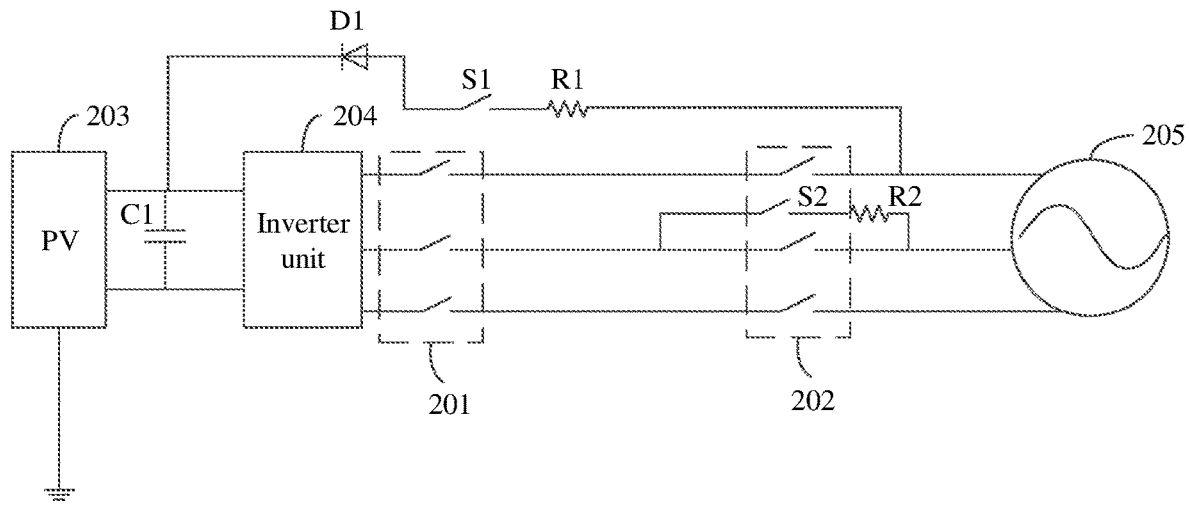

The structure of the circuit may be first described with reference to a classical inverter system. FIG. 2a is a schematic diagram of a structure of a circuit. As shown in FIG. 2a, a classical inverter system includes a PV cell 203, an inverter unit 204, a first group of relays 201, and a second group of relays 202. The inverter unit is configured to convert a direct current generated by the PV cell 203 into an alternating current that can be connected in parallel to a power grid 205, where a frequency and a phase of the alternating current are the same as those of the power grid. All existing mature structures in a conventional technology that are about the inverter unit and that implement the foregoing functions can be used. In addition, it should be noted that, when the pre-charging circuit provided in this solution charges a bus capacitor, the inverter unit is controlled not to perform inversion. In other words, during pre-charging, the inverter unit does not need to convert a direct current into an alternating current. The inverter unit is only used for conduction during pre-charging. One end of the circuit is connected to the power grid 205, and the other end of the circuit is connected to the PV cell. The circuit may include a current-limiting apparatus R1, a switch S1, a diode D1, a capacitor C1 (also referred to as a bus capacitor), an inverter unit 204, a switch S2, and a current-limiting apparatus R2. The current-limiting apparatus R2 and the switch S2 are connected in series and then connected in parallel to any relay of the first group of relays 201 and the second group of relays 202. In other words, any one of three relays in the first group of relays 201 or any one of three relays in the second group of relays 202 may be selected to be connected in parallel to the current-limiting apparatus R2 and the switch S2. A relay connected in parallel to the current-limiting apparatus R2 and the switch S2 is referred to as a first relay below, and a phase in which the first relay is located is referred to as a first phase, which is also referred to as a first phase of the power grid. A description is provided by using an example in which the power grid is a three-phase three-wire power grid. The power grid further includes two phases. The two phases are referred to as a second phase (which is also referred to as a second phase) and a third phase (which is also referred to as a third phase) below. After the switch S1, the current-limiting apparatus R1, and the diode D1 are connected in series, one end of a line formed by the series connection is connected to the capacitor, and the other end of the line is connected to a phase of the power grid other than the first phase, or the other end of the line is connected to a phase of the power grid other than the first phase by using a relay. For example, when the power grid 205 is a three-phase three-wire power grid, phases of the power grid other than the first phase include the second phase and the third phase. FIG. 2a is a schematic diagram illustrating a case: After the switch S1, the current-limiting apparatus R1, and the diode D1 are connected in series, one end of the line formed by the series connection is connected to the capacitor, and the other end of the line is connected to a phase of the power grid other than the first phase by using a switch. FIG. 2b is a schematic diagram illustrating a case: After the switch S1, the current-limiting apparatus R1, and the diode D1 are connected in series, one end of the line formed by the series connection is connected to the capacitor, and the other end of the line is connected to a phase of the power grid other than the first phase. To better describe the case in which the current-limiting apparatus R2 and the switch S2 are connected in series and then connected in parallel to any relay of the first group of relays 201 and the second group of relays 202, in FIG. 2b, at a position different from a position in FIG. 2a at which the current-limiting apparatus R2 and the switch S2 connected in series are located, the current-limiting apparatus R2 and the switch S2 are connected in series and then connected in parallel to any relay of the second group of relays. It should be noted that, the switch S1, the current-limiting apparatus R1, and the diode D1 only need to be connected in series without limiting a connection sequence thereof. For components connected in series, a connection sequence of the components is not limited, and details are not described again below.

It should be noted that, the current-limiting apparatus R1 and the current-limiting apparatus R2 each may be one or any combination of a current-limiting resistor, an inductor, and a choke.

In addition, the switch S1 and the switch S2 each may be a relay, a metal-oxide semiconductor field-effect transistor (MOSFET), an insulated gate bipolar transistor (IGBT), or the like.

In addition, the diode is a unidirectional conduction component. Another unidirectional conduction component may also be used. For example, the unidirectional conduction component may further include a controller, a sampling circuit, a detection circuit, a protection circuit, and the like. This is not limited in this embodiment. In all embodiments, a diode is used as an example.

Figure 3:
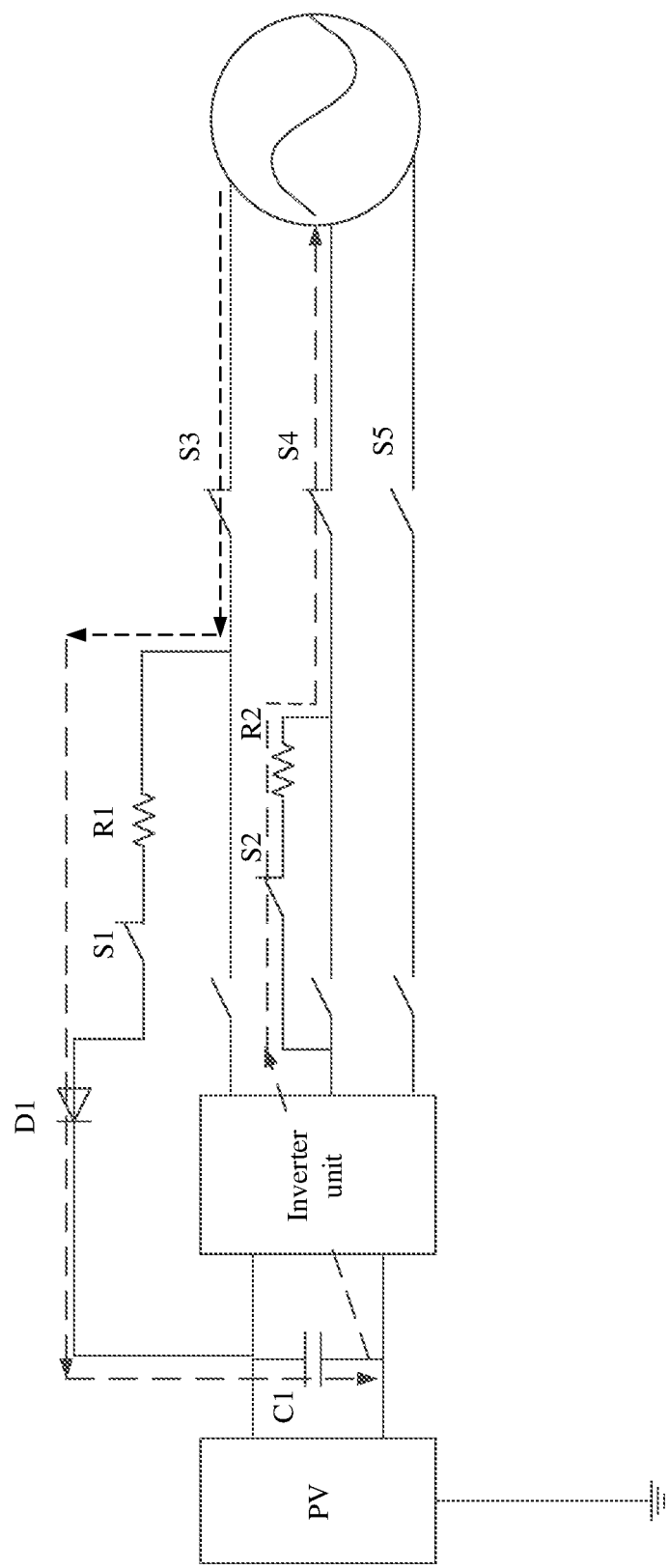
FIG. 3 is a schematic diagram of a charging path of a circuit according to an embodiment.

With reference to FIG. 3, the following describes a working principle of the circuit by using FIG. 2a as an example. FIG. 3 is a schematic diagram of a charging path of a circuit. When the PV cell cannot output a direct current, for example, at night, an alternating current auxiliary source providing a power supply to a control unit and the switches S1 and S2 keeps working (the control unit and the alternating current auxiliary source are not shown in the figure). The control unit may send a control instruction to each component in the inverter and may receive a scheduling instruction sent by the power grid. When there is a need to send reactive power at night, for example, the control unit receives the scheduling instruction, it is determined that reactive compensation needs to be performed.

In one manner, if the control unit cannot separately control turn-on/off of all relays, the control unit can only control turn-on/off of the relays uniformly. For understanding a definition of uniform control, refer to the foregoing description. Details are not described herein again. In this case, the control unit may control the second group of relays to be closed (in this case, S3, S4, and S5 are closed at the same time) and control S1 and S2 to be closed. In this way, a current may pass through a closed loop formed by S3, R1, S1, D1, C1, the inverter unit, S2, R2, and S4, to charge C1. When a voltage of C1 is close to or equal to a rectified voltage of the power grid, the control unit controls the first group of relays to be closed. In this way, C1 can be supplied with power by using the first group of relays, the second group of relays, and the inverter unit. The control unit controls S1 and S2 to be opened, so that the inverter can perform reactive compensation.

Figure 4:
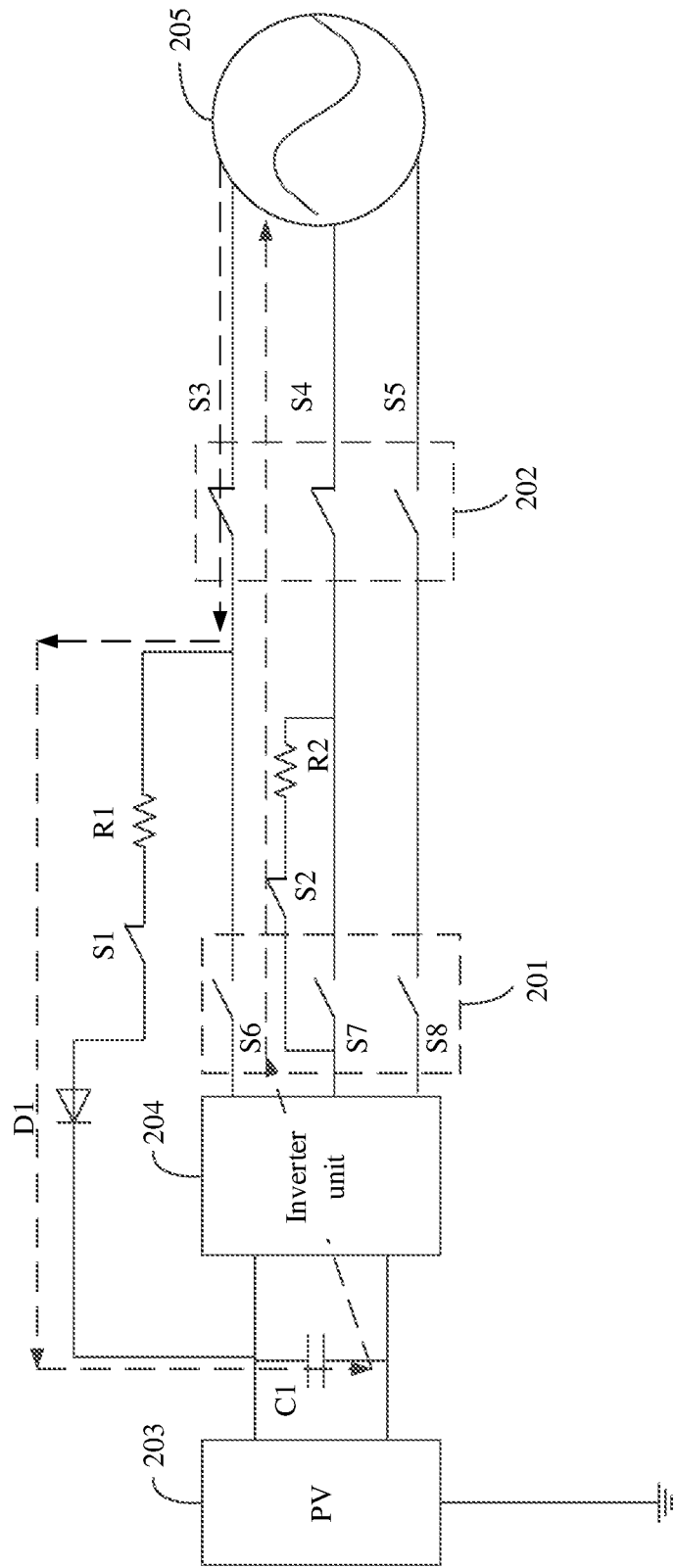
FIG. 4 is a schematic diagram of a charging path of another circuit according to an embodiment.

Alternatively, the control unit may separately control turn-on/off of the relays. For understanding a definition of separate control, refer to the foregoing description. Details are not described herein again. The following provides a description by using FIG. 2a as an example. In this case, as shown in FIG. 4, the control unit controls S3, S4, S1, and S2 to be closed. In this way, a current may pass through a closed loop formed by S3, R1, S1, D1, C1, the inverter unit, S2, R2, and S4, to charge C1. When a voltage of C1 is close to or equal to a rectified voltage of the power grid, the control unit controls S6, S7, S8, S4, and S5 to be closed. In this way, C1 can be supplied with power by using the first group of relays, the second group of relays, and the inverter unit. The control unit controls S1 and S2 to be opened, so that the inverter can perform reactive compensation.

Figure 5A:
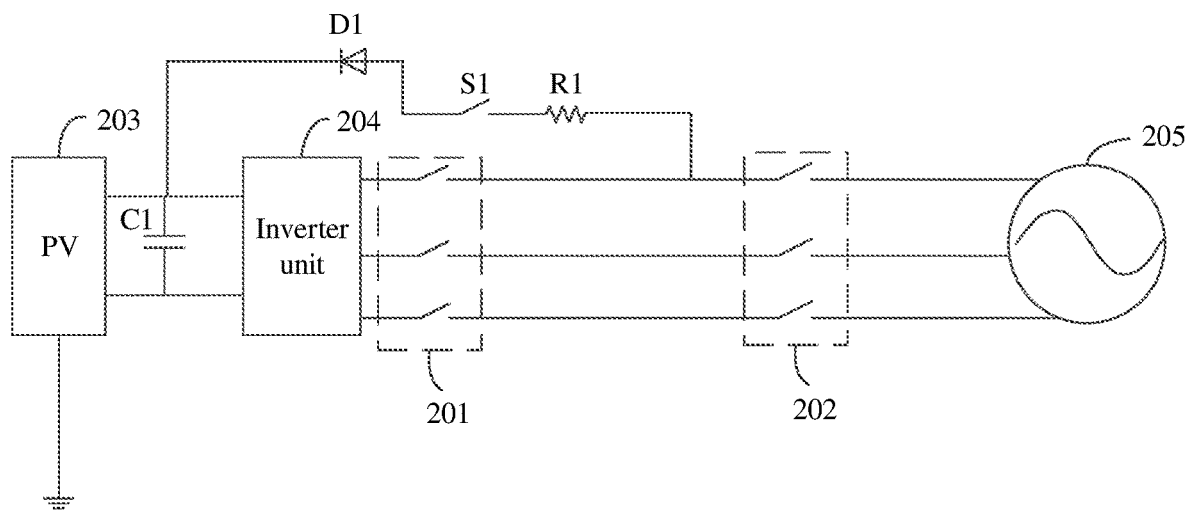
FIG. 5a and FIG. 5b each are a schematic diagram of a structure of another circuit according to an embodiment.
Figure 5B:
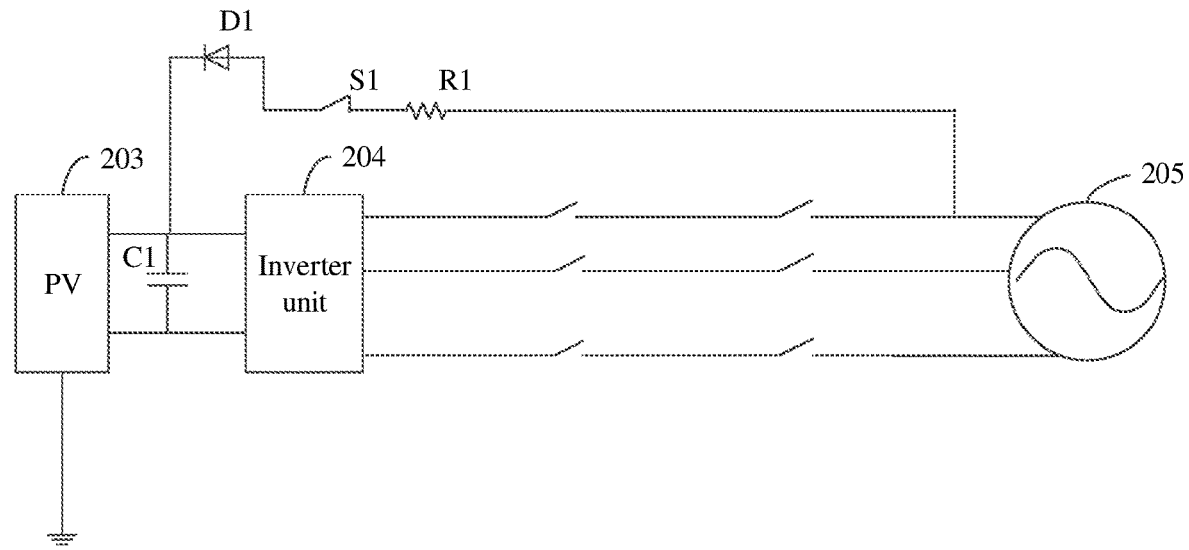

It should be noted that, when the control unit may separately control turn-on/off of the relays, the circuit may be further simplified. The following provides a description with reference to FIG. 5a and FIG. 5b. The circuit may include a current-limiting apparatus R1, a switch S1, a diode D1, a capacitor C1, and an inverter unit. After the current-limiting apparatus R1, the switch S1, and the diode D1 are connected in series, one end of a line formed by the series connection is connected to C1, and the other end of the line is connected to a power grid, or the other end of the line is connected to a power grid by using a relay. For understanding the current-limiting apparatus R1, the switch S1, the diode D1, the capacitor C1, and the inverter unit, refer to FIG. 2a and FIG. 2b. Details are not described herein again. FIG. 5a is a schematic diagram illustrating a case: After the switch S1 and the diode D1 are connected in series, one end of the line formed by the series connection is connected to C1, and the other end of the line is connected to the power grid by using a relay. FIG. 5b is a schematic diagram illustrating a case: After the switch S1 and the diode D1 are connected in series, one end of the line formed by the series connection is connected to C1, and the other end of the line is connected to the power grid.

Figure 6:
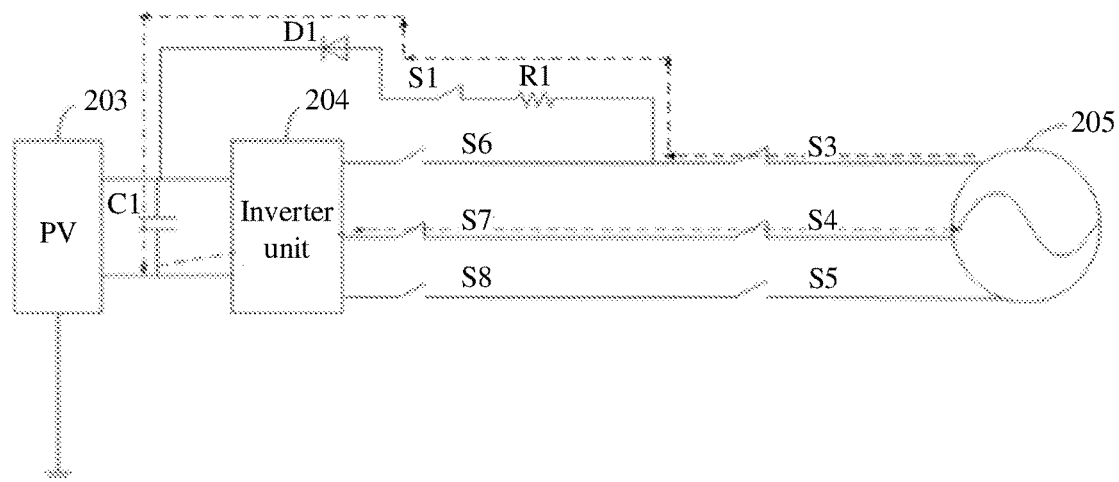
FIG. 6 is a schematic diagram of a charging path of another circuit according to an embodiment.

With reference to FIG. 6, the following describes a working principle of the circuit by using FIG. 5a as an example. FIG. 6 is a schematic diagram of a charging path of a circuit. The control unit controls S3, S1, S7, and S4 to be closed. In this way, a current may pass through a closed loop formed by S3, R1, S1, D1, C1, the inverter unit, S7, and S4, to charge C1. When a voltage of C1 is close to or equal to a rectified voltage of the power grid, the control unit controls S6, S8, and S5 to be closed. In this way, C1 can be supplied with power by using the first group of relays, the second group of relays, and the inverter unit. The control unit controls S1 to be opened, so that the inverter can perform reactive compensation.

It should be noted that, during pre-charging of C1, as shown in FIG. 5a and FIG. 5b, the control unit only needs to control the switch S1 to be closed, or as shown in FIG. 2a and FIG. 2b, the control unit only needs to control the switches S1 and S2 to be closed. Which relay in the first group of relays and the second group of relays is controlled by the control unit to be closed is not limited, provided that a closed loop can be formed to charge C1. For example, in the circuit shown in FIG. 6, the control unit may also control S3, S1, S8, and S5 to be closed. In this way, a current may pass through a closed loop formed by S3, R1, S1, D1, C1, the inverter unit, S8, and S5, to charge C1.

The structure of the circuit is described above with reference to the classical inverter system. Based on the classical inverter system, only a small quantity of components may be added to pre-charge the bus capacitor when no direct current is input, so as to supply power to an entire inverter system for reactive compensation. The pre-charging circuit has a simple structure and lower costs.

The classical inverter system includes two groups of relays. It should be noted that, the relay in the classical inverter system may be replaced with a MOSFET, an IGBT, or the like. Any component may be used to replace the relay, provided that the component can implement a function of conducting and disconnecting a circuit. The following describes a case in which the inverter system includes only one group of relays.

Figure 7:
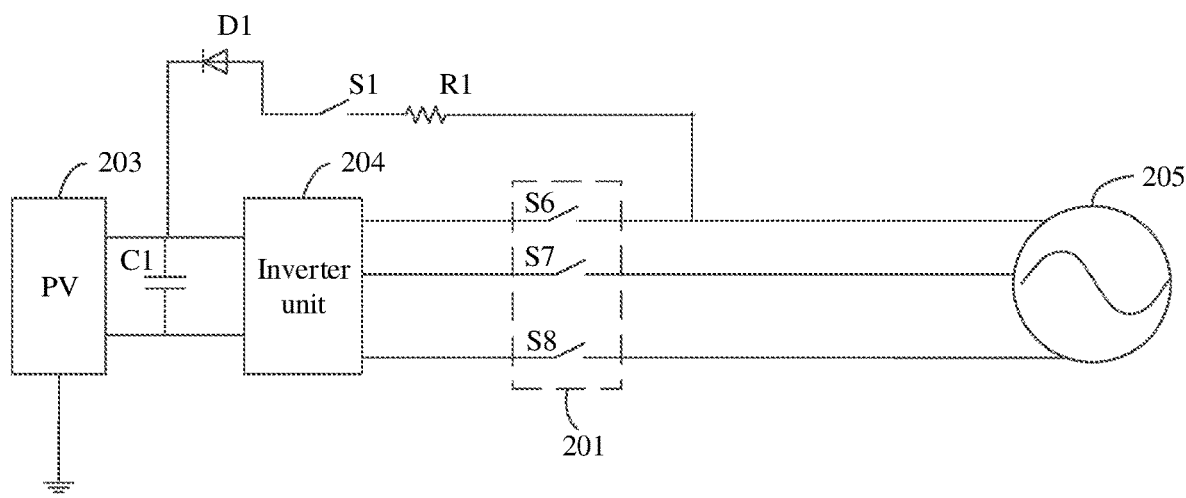
FIG. 7 is a schematic diagram of a structure of another circuit according to an embodiment.

As shown in FIG. 7, an inverter system includes one group of relays 201. After a current-limiting apparatus R1, a switch S1, and a diode D1 are connected in series, one end of a line formed by the series connection is connected to C1, and the other end of the line is connected to a power grid. Because the inverter system includes only one group of relays 201, after the current-limiting apparatus R1, the switch S1, and the diode D1 are connected in series, when one end of the line formed by the series connection is connected to C1, and the other end of the line is connected to the power grid by using a switch, R1, S1 and D1 cannot form a closed loop to charge C1. Therefore, in such a system, after the current-limiting apparatus R1, the switch S1, and the diode D1 are connected in series, one end of the line formed by the series connection is connected to C1, and the other end of the line is directly connected to the power grid. For understanding the current-limiting apparatus R1, the switch S1, the diode D1, the capacitor C1, and the inverter unit, refer to FIG. 2a and FIG. 2b. Details are not described herein again.

Figure 8:
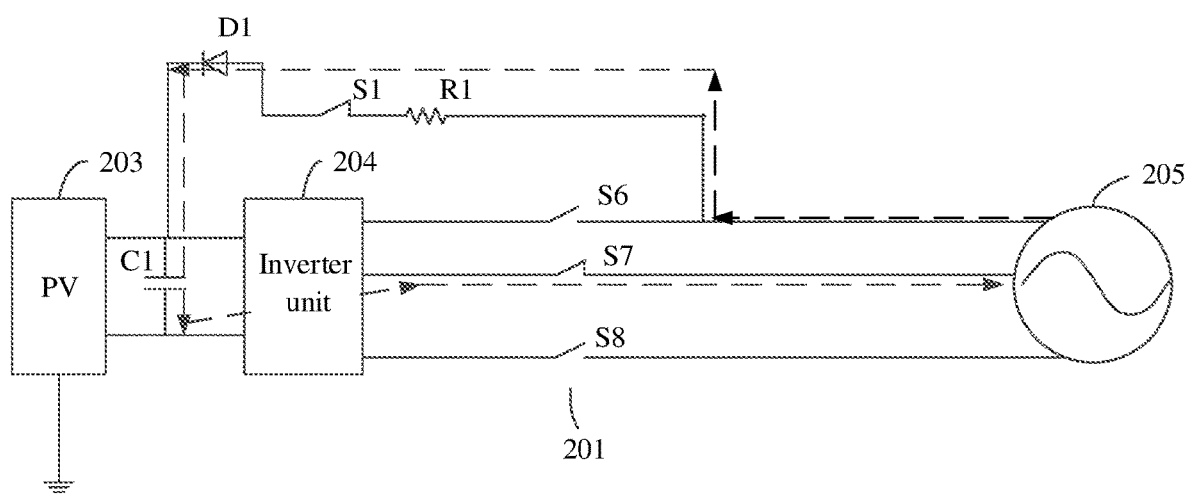
FIG. 8 is a schematic diagram of a charging path of another circuit according to an embodiment.

With reference to FIG. 8, the following describes a working principle of the circuit shown in FIG. 7. FIG. 8 is a schematic diagram of a charging path of a circuit. A control unit controls S1 and S7 to be closed. In this way, a current may pass through a closed loop formed by S6, R1, S1, D1, C1, the inverter unit, and S7, to charge C1. When a voltage of C1 is close to or equal to a rectified voltage of the power grid, the control unit controls S6 and S8 to be closed. In this way, C1 can be supplied with power by using S6, S7, S8, and the inverter unit. The control unit controls S1 to be opened, so that the inverter can perform reactive compensation.

FIG. 1a to FIG. 8 are all described by using an example in which the power grid is a three-phase power grid. For example, the power grid may be a three-phase three-wire power grid or a three-phase four-wire power grid. A type of the power grid is not limited. With reference to a scenario in FIG. 9a and FIG. 9b in which the power grid is a single-phase power grid, the circuit is described below.

Figure 9A:
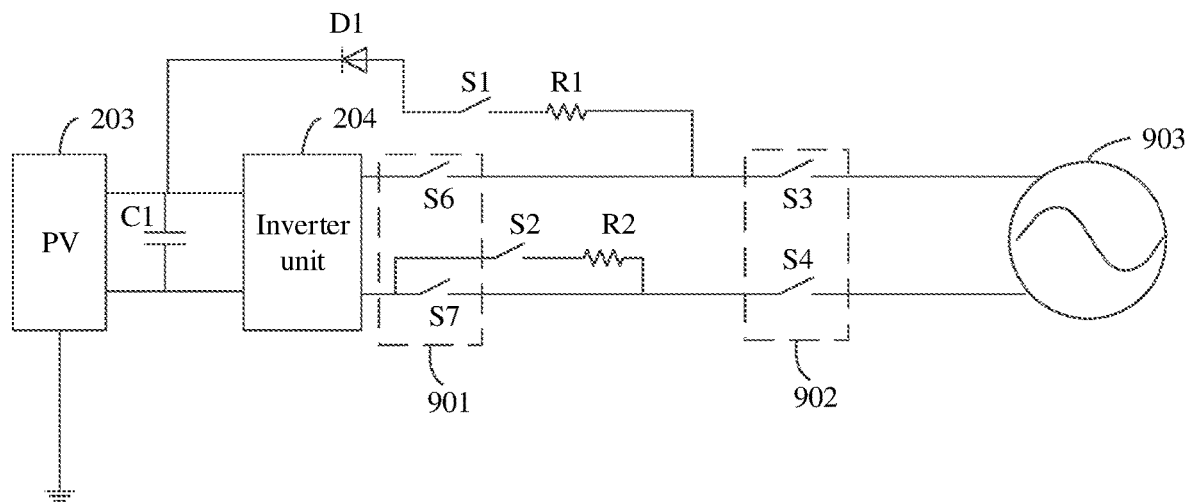
FIG. 9a and FIG. 9b each are a schematic diagram of a structure of another circuit according to an embodiment.
Figure 9B:
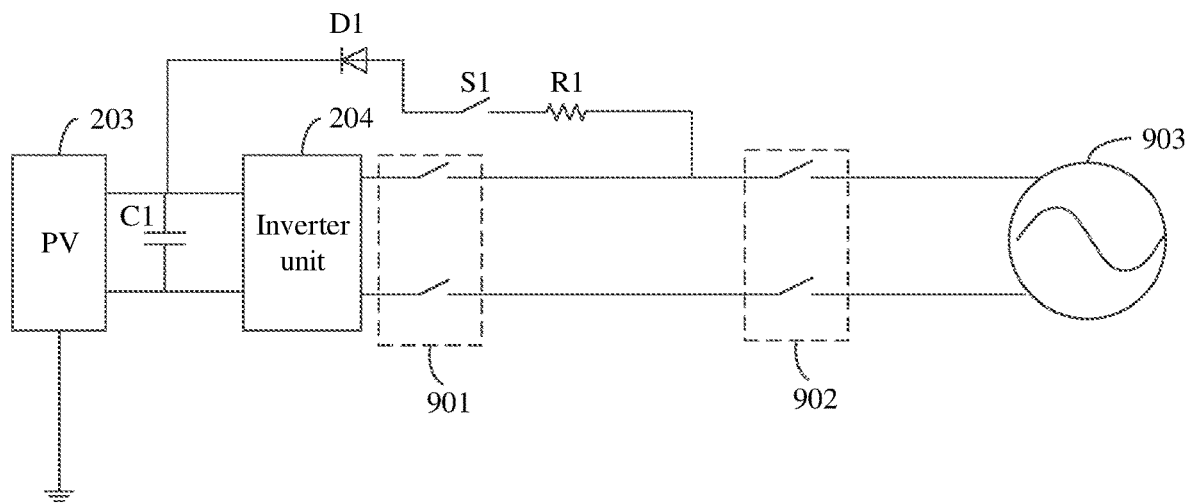

As shown in FIG. 9a and FIG. 9b, an inverter system includes a PV cell 203, an inverter unit 204, a first group of relays 901, and a second group of relays 902, and the power grid 903 is a single-phase power grid. The first group of relays 901 includes two relays, and the second group of relays 902 includes two relays. As shown in FIG. 9a and FIG. 9b, a current-limiting apparatus R2 and a switch S2 are connected in series and then connected in parallel to any relay of the first group of relays 901 and the second group of relays 902. It is assumed that a relay connected in parallel to the current-limiting apparatus R2 and the switch S2 is referred to as a first relay. The first relay is disposed in a first phase. After a switch S1, a current-limiting apparatus R1, and a diode D1 are connected in series, one end of a line formed by the series connection is connected to a capacitor, and the other end of the line is connected to another phase of the power grid. For example, if the first relay is disposed on a phase wire, after the switch S1, the current-limiting apparatus R1, and the diode D1 are connected in series, one end of the line formed by the series connection is connected to the capacitor, and the other end of the line is connected to a neutral wire of the power grid, or the other end of the line is connected to a neutral wire of the power grid by using a relay. If the first relay is disposed on the neutral wire, after the switch S1, the current-limiting apparatus R1, and the diode D1 are connected in series, one end of the line formed by the series connection is connected to the capacitor, and the other end of the line is connected to the phase wire of the power grid, or the other end of the line is connected to the phase wire of the power grid by using a relay. For understanding the current-limiting apparatus R1, the switch S1, the diode D1, the capacitor C1, and the inverter unit, refer to FIG. 2a and FIG. 2b. Details are not described herein again. FIG. 9a and FIG. 9b show the following manner: After the current-limiting apparatus R1, the switch S1, and the diode D1 are connected in series, one end of the line formed by the series connection is connected to C1, and the other end of the line is connected to the power grid by using a relay.

Figure 10:
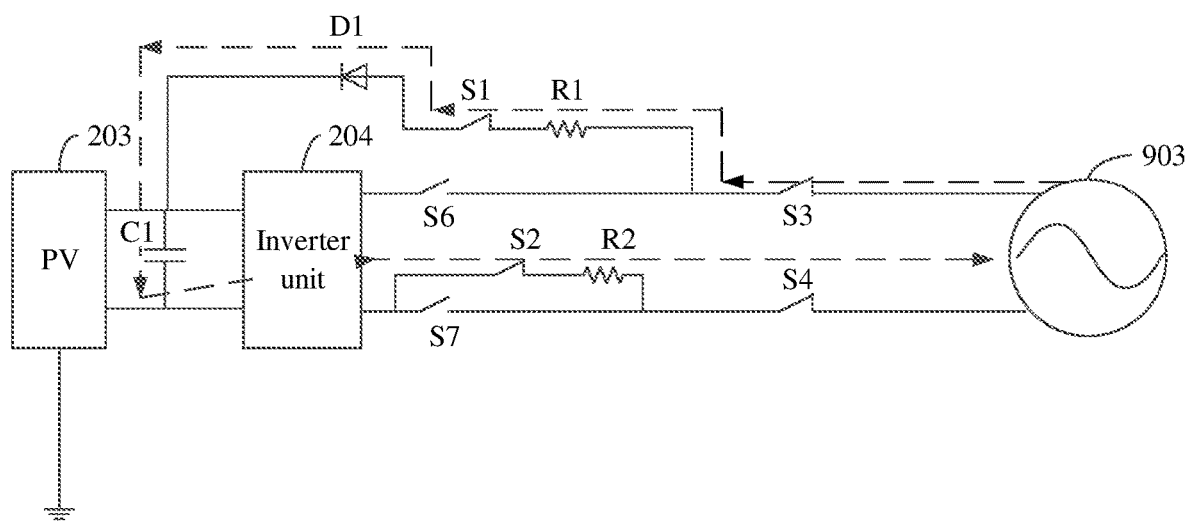
FIG. 10 is a schematic diagram of a charging path of another circuit according to an embodiment.

In the structure shown in FIG. 9a, a control unit may perform uniform control or separate control. With reference to FIG. 10, the following describes a principle of the circuit by using an example in which the control unit performs uniform control. The control unit controls the second group of relays to be closed. In other words, the control unit controls S3 and S4 to be closed at the same time. In this way, a current may pass through a closed loop formed by S3, R1, S1, D1, C1, the inverter unit, S2, R2, and S4, to charge C1. When a voltage of C1 is close to or equal to a rectified voltage of the power grid, the control unit controls the first group of relays to be closed, in other words, the control unit controls S6 and S7 to be closed at the same time. In this way, C1 can be supplied with power by using the first group of relays, the second group of relays, and the inverter unit. The control unit controls S1 and S2 to be opened, so that the inverter can perform reactive compensation.

Figure 11:
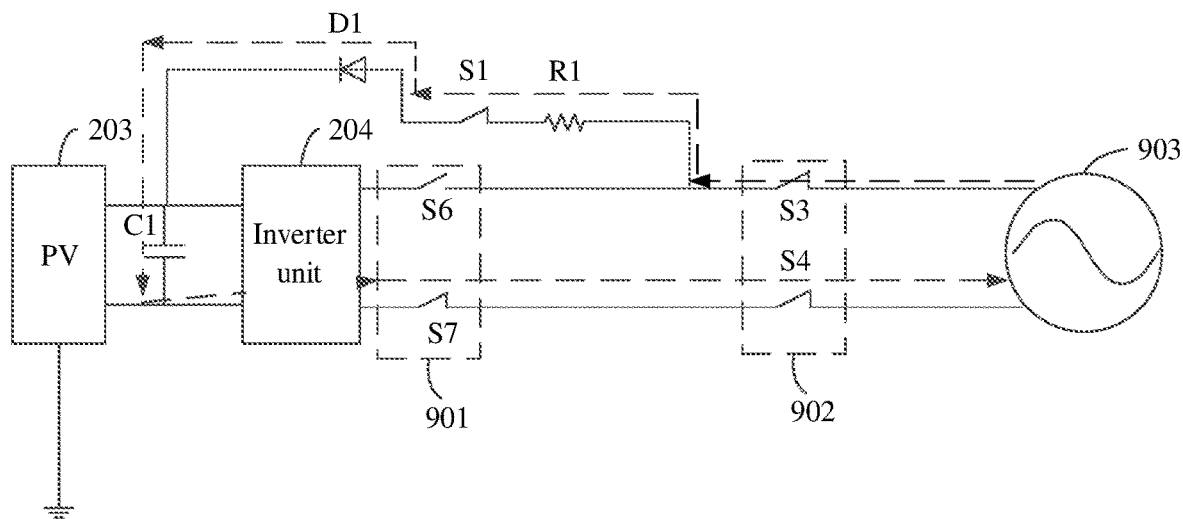
FIG. 11 is a schematic diagram of a structure of another circuit according to an embodiment.

In the structure shown in FIG. 9b, the control unit may perform separate control. The following describes a principle of the circuit with reference to FIG. 11. The control unit controls S3, S1, S7, and S4 to be closed. In this way, a current may pass through a closed loop formed by S3, R1, S1, D1, C1, the inverter unit, S7, and S4, to charge C1. When a voltage of C1 is close to or equal to a rectified voltage of the power grid, the control unit controls S6 to be closed. In this way, C1 can be supplied with power by using the first group of relays, the second group of relays, and the inverter unit. The control unit controls S1 to be opened, so that the inverter can perform reactive compensation.

The foregoing describes the pre-charging circuit. The circuit has a simple structure and can avoid current shock resulting from a large voltage difference between a direct current bus voltage and a peak voltage of the power grid at a moment of grid connection.

An embodiment further provides an inverter, including a control unit and an inverter power unit. The control unit is configured to control working of the inverter power unit. The inverter power unit includes the circuits described in FIG. 2a to FIG. 11.

An embodiment further provides a power generation system, including a PV cell, an inverter, and a power grid. A photovoltaic panel is connected to the inverter, and the inverter is connected to the power grid. The photovoltaic panel is configured to convert light energy into a direct current. The inverter includes the circuits described in FIG. 2a to FIG. 11, is configured to convert the direct current into an alternating current and is further configured to perform reactive compensation on the power generation system. The power grid is configured to transfer the alternating current.

In the power generation system, during implementation of a reactive compensation function at night, the PV cell needs to be isolated from the power grid sometimes to avoid impact of the power grid on the PV cell. The following provides a description with reference to FIG. 12 to FIG. 15. In this embodiment, the PV cell is isolated from the power grid by adding an isolation unit. The isolation unit is disposed between the PV cell and the inverter. Solutions shown in FIG. 12 to FIG. 15 may be combined with the solutions shown in FIG. 2a to FIG. 11. The following describes the isolation unit based on FIG. 2a.

Figure 12:
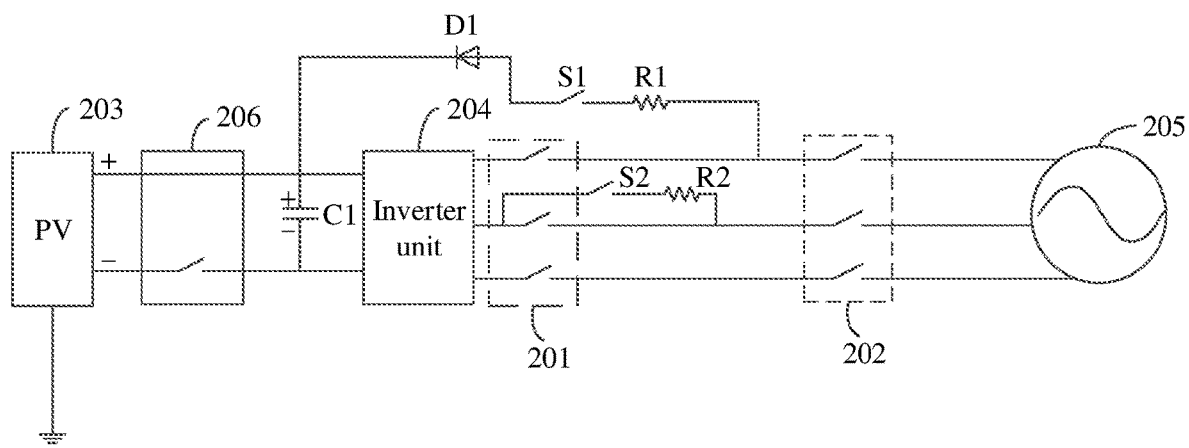
FIG. 12 is a schematic diagram of a structure of another circuit according to an embodiment.
Figure 13:
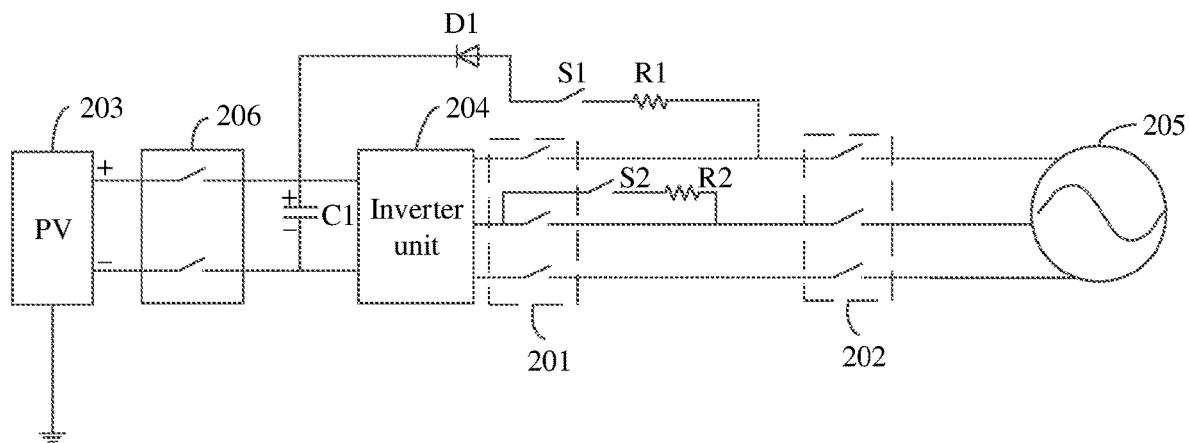
FIG. 13 is a schematic diagram of a structure of another circuit according to an embodiment.
Figure 14:
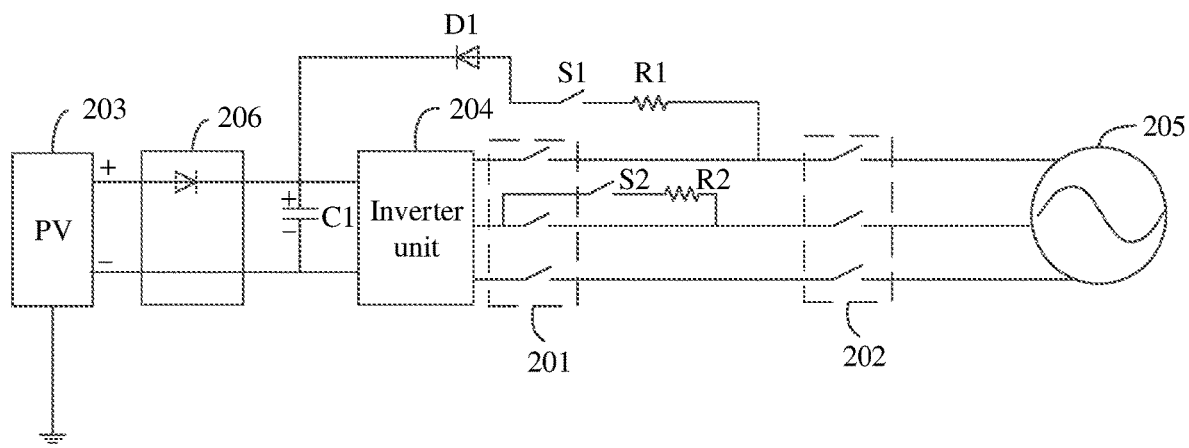
FIG. 14 is a schematic diagram of a structure of another circuit according to an embodiment.
Figure 15:
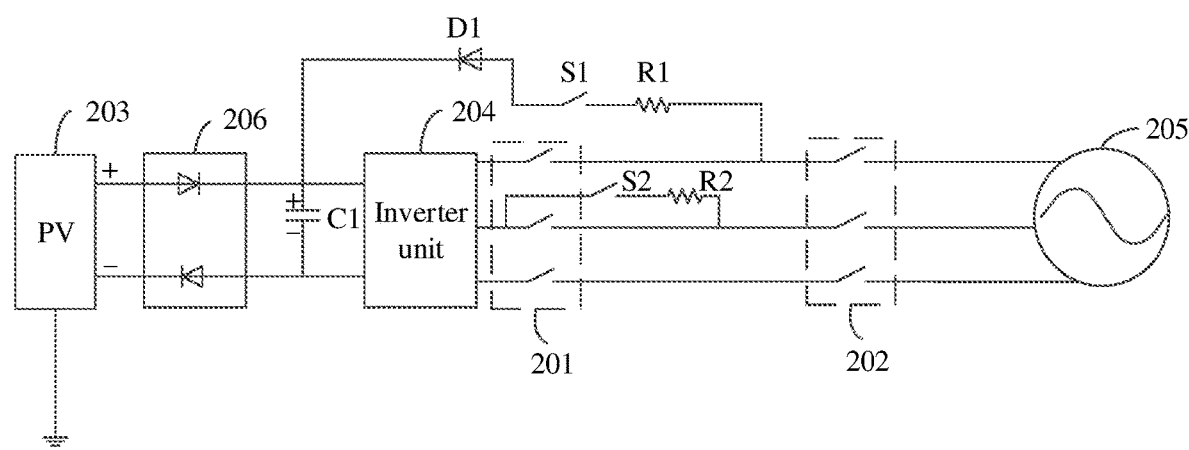
FIG. 15 is a schematic diagram of a structure of another circuit according to an embodiment.

As shown in FIG. 12 to FIG. 15, the isolation unit 206 is added based on FIG. 2a. The isolation unit 206 may be implemented mechanically. As shown in FIG. 12 and FIG. 13, an isolation effect is achieved by using a switch. The switch may be a relay, a contactor component, or the like. As shown in FIG. 12, only a positive electrode or a negative electrode of the PV cell connected to the power grid may be disconnected. FIG. 12 shows a case in which only the negative electrode is disconnected. Alternatively, as shown in FIG. 13, the positive electrode and the negative electrode each may be disconnected by using a switch. In addition to the manners in FIG. 12 and FIG. 13 in which isolation is implemented by using a switch, isolation may be implemented in other manners, for example, by using a semiconductor device. For example, as shown in FIG. 14, only the positive electrode or the negative electrode of the PV cell connected to the power grid is disconnected by using a diode. FIG. 14 shows a case in which only the positive electrode is disconnected. Alternatively, as shown in FIG. 15, the positive electrode and the negative electrode each may be disconnected by using a diode.

The circuit, the inverter, and the power generation system provided in the embodiments are described in detail above. The principle and implementations are described herein using examples. The descriptions about the embodiments are merely provided to help understand the method and ideas. In addition, a person of ordinary skill in the art can make variations and modifications in terms of the implementations based on the ideas. Therefore, the descriptions herein shall not be construed as a limit the embodiments.

What is claimed is:

1. A pre-charging circuit, comprising
a first switch;
a second switch;
a diode;
a first current-limiting apparatus;
a capacitor; and
an inverter unit, wherein one end of the pre-charging circuit is connected to a power grid;
after the first current-limiting apparatus, the first switch, and the diode are connected in series, one end of a line formed by the series connection is connected to one terminal of the capacitor, the other end of the line is connected to a first-phase alternating current of the power grid, and the other terminal of the capacitor is connected to a second-phase alternating current of the power grid via the inverter unit and the second switch successively; and
after the first switch and the second switch are closed, a current output by the power grid passes through a closed loop formed by the first current-limiting apparatus, the first switch, the diode, the capacitor, the inverter unit, and the second switch, to charge the capacitor.

2. The pre-charging circuit according to claim 1, further comprising:
a third switch, wherein
after the first current-limiting apparatus, the first switch, and the diode are connected in series, the other end of the line is connected to the first-phase alternating current of the power grid by using the third switch; and
after the first switch, the second switch, and the third switch are closed, the current output by the power grid passes through a closed loop formed by the third switch, the first current-limiting apparatus, the first switch, the diode, the capacitor, the inverter unit, and the second switch, to charge the capacitor.

3. The pre-charging circuit according to claim 2, further comprising:
a fourth switch, wherein the fourth switch is connected in series to the second switch, and the other terminal of the capacitor is connected to the second-phase alternating current of the power grid via the inverter unit, the second switch, and the fourth switch successively; and
after the first switch, the third switch, the second switch, and the fourth switch are closed, the current output by the power grid passes through a closed loop formed by the third switch, the first current-limiting apparatus, the first switch, the diode, the capacitor, the inverter unit, the second switch, and the fourth switch, to charge the capacitor.

4. The pre-charging circuit according to claim 3, further comprising:
a fifth switch and
a second current-limiting apparatus, wherein the fifth switch and the second current-limiting apparatus are connected in series and then connected in parallel to the second switch, and
after the fifth switch and the second current-limiting apparatus are connected in series, one end of a line formed by the series connection is connected to the inverter unit, and the other end of the line is connected to the second-phase alternating current of the power grid; and
after the first switch, the third switch, the fifth switch, and the fourth switch are closed, the current output by the power grid passes through a closed loop formed by the third switch, the first current-limiting apparatus, the first switch, the diode, the capacitor, the inverter unit, the fifth switch, and the fourth switch, to charge the capacitor.

5. The pre-charging circuit according to claim 3, further comprising:
a fifth switch and
a second current-limiting apparatus, wherein the fifth switch and the second current-limiting apparatus are connected in series and then connected in parallel to the fourth switch, and after the fifth switch and the second current-limiting apparatus are connected in series, one end of a line formed by the series connection is connected to the inverter unit, and the other end of the line is connected to the second-phase alternating current of the power grid; and
after the first switch, the third switch, the fifth switch, and the second switch are closed, the current output by the power grid passes through a closed loop formed by the third switch, the first current-limiting apparatus, the first switch, the diode, the capacitor, the inverter unit, the second switch, and the fifth switch, to charge the capacitor.

6. The pre-charging circuit according to claim 1, wherein the current-limiting apparatus is one or a combination of a resistor and an inductor.

7. The pre-charging circuit according to claim 1, wherein the first switch, the second switch, the third switch, the fourth switch, and the fifth switch each are a relay, a metal-oxide semiconductor field-effect transistor (MOSFET), or an insulated gate bipolar transistor (IGBT).

8. An inverter, comprising:
a control unit; and
an inverter power unit, wherein the control unit is configured to control the inverter power unit, and the inverter power unit comprises the pre-charging circuit according to claim 1.

9. A power generation system, comprising
a photovoltaic PV cell;
an inverter; and
a power grid, wherein the PV cell is connected to the inverter, and the inverter is connected to the power grid; the PV cell is configured to convert light energy into a direct current; the inverter comprising a capacitor, wherein one end of the pre-charging circuit is connected to a power grid; one end of a line formed by the series connection is connected to one terminal of the capacitor, the other end of the line is connected to a first-phase alternating current of the power grid, and the other terminal of the capacitor is connected to a second-phase alternating current of the power grid and a current output by the power grid passes through a closed loop formed by the capacitor to charge the capacitor; wherein the inverter is configured to convert the direct current into an alternating current, and perform reactive compensation on the power grid; and the alternating current power grid is configured to transfer the alternating current.

10. The power generation system according to claim 9, wherein the inverter further comprises:
an isolation unit; and the isolation unit comprises:
a sixth switch; and one terminal of the sixth switch is connected to a positive electrode of the PV cell, and the other terminal of the sixth switch is connected to a positive electrode of a circuit connected to the power grid, or one terminal of the sixth switch is connected to a negative electrode of the PV cell, and the other terminal of the sixth switch is connected to a negative electrode of a circuit connected to the power grid.

11. The power generation system according to claim 9, wherein the inverter further comprises:
an isolation unit; and the isolation unit comprises:
a unidirectional conduction component; and one terminal of the unidirectional conduction component is connected to a positive electrode of the PV cell, and the other terminal of the unidirectional conduction component is connected to a positive electrode of a circuit connected to the power grid, or one terminal of the unidirectional conduction component is connected to a negative electrode of the PV cell, and the other terminal of the unidirectional conduction component is connected to a negative electrode of a circuit connected to the power grid.

12. The power generation system according to claim 9, wherein the inverter further comprises:
a first switch;
a second switch;
a diode;
a first current-limiting apparatus; and
an inverter unit, wherein one end of the pre-charging circuit is connected to a power grid;
after the first current-limiting apparatus, the first switch, and the diode are connected in series, one end of a line formed by the series connection is connected to one terminal of the capacitor, the other end of the line is connected to a first-phase alternating current of the power grid, and the other terminal of the capacitor is connected to a second-phase alternating current of the power grid via the inverter unit and the second switch successively; and after the first switch and the second switch are closed, a current output by the power grid passes through a closed loop formed by the first current-limiting apparatus, the first switch, the diode, the capacitor, the inverter unit, and the second switch, to charge the capacitor.

13. The power generation system according to claim 12, further comprising:
a third switch, wherein after the first current-limiting apparatus, the first switch, and the diode are connected in series, the other end of the line is connected to the first-phase alternating current of the power grid by using the third switch.

14. The power generation system according to claim 13, wherein after the first switch, the second switch, and the third switch are closed, the current output by the power grid passes through a closed loop formed by the third switch, the first current-limiting apparatus, the first switch, the diode, the capacitor, the inverter unit, and the second switch, to charge the capacitor.

15. The power generation system according to claim 13, further comprising:
a fourth switch, wherein the fourth switch is connected in series to the second switch, and the other terminal of the capacitor is connected to the second-phase alternating current of the power grid via the inverter unit, the second switch, and the fourth switch successively; and
after the first switch, the third switch, the second switch, and the fourth switch are closed, the current output by the power grid passes through a closed loop formed by the third switch, the first current-limiting apparatus, the first switch, the diode, the capacitor, the inverter unit, the second switch, and the fourth switch, to charge the capacitor.

16. The power generation system according to claim 14, further comprising:
a fifth switch and
a second current-limiting apparatus, wherein the fifth switch and the second current-limiting apparatus are connected in series and then connected in parallel to the second switch, and after the fifth switch and the second current-limiting apparatus are connected in series, one end of a line formed by the series connection is connected to the inverter unit, and the other end of the line is connected to the second-phase alternating current of the power grid; and
after the first switch, the third switch, the fifth switch, and the fourth switch are closed, the current output by the power grid passes through a closed loop formed by the third switch, the first current-limiting apparatus, the first switch, the diode, the capacitor, the inverter unit, the fifth switch, and the fourth switch, to charge the capacitor.

17. The power generation system according to claim 14, further comprising:
a fifth switch; and
a second current-limiting apparatus, wherein the fifth switch and the second current-limiting apparatus are connected in series and then connected in parallel to the fourth switch, and
after the fifth switch and the second current-limiting apparatus are connected in series, one end of a line formed by the series connection is connected to the inverter unit, and the other end of the line is connected to the second-phase alternating current of the power grid; and after the first switch, the third switch, the fifth switch, and the second switch are closed, the current output by the power grid passes through a closed loop formed by the third switch, the first current-limiting apparatus, the first switch, the diode, the capacitor, the inverter unit, the second switch, and the fifth switch, to charge the capacitor.

* * * * *